Nov. 27, 1956 R. E. BACHMAN 2,771,791
DIFFERENTIAL GEARING APPARATUS
Filed Dec. 13, 1954
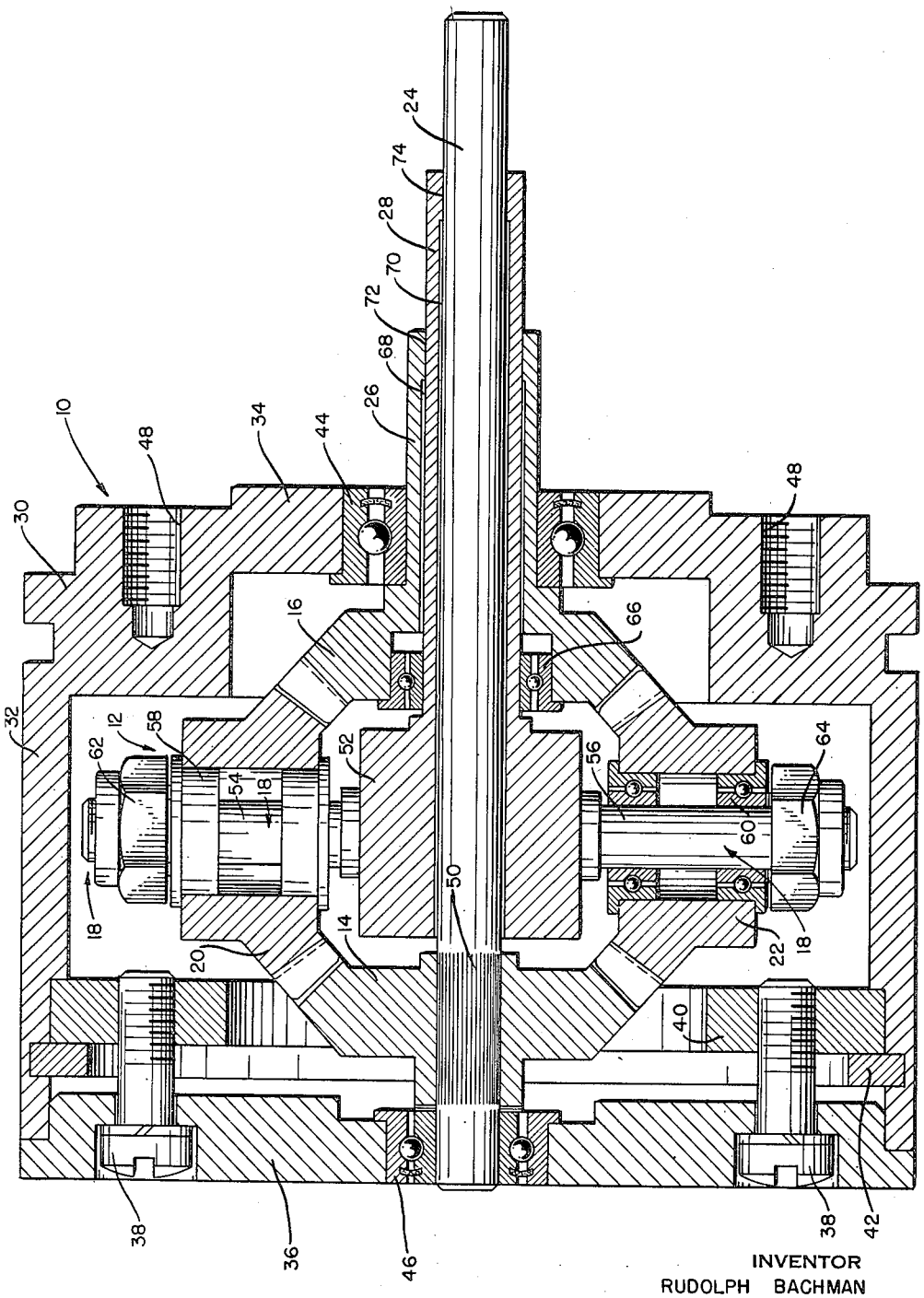
INVENTOR
RUDOLPH BACHMAN
BY
James & Franklin
ATTORNEYS 2,771,791
Patented Nov. 27, 1956

2,771,791
DIFFERENTIAL GEARING APPARATUS

Rudolph E. Bachman, Babylon, N. Y., assignor to Trans-American Precision Instrument Corp., Flushing, N. Y., a corporation of New York Application December 13, 1954, Serial No. 474,677

2 Claims. (Cl. 74—675)

This invention relates to improvements in a differential gearing system or apparatus.

The prime object of the invention centers about the provision of a differential gearing system or apparatus in which all of the three operative shafts of the system extend only from one side or end of the apparatus whereby all of the gearing connections to the differential system may be located and made on one side of the differential system.

Ancillary objects of the invention relate to the provision of a differential gearing system having all of its driving and driven shafts extending only from one side of the system in which the differential gearing mechanism is effectively encased and sealed in a gear housing and in which all of the moving parts of the gear mechanism are mutually supported and are strongly mounted as a unit in the gear housing.

To the accomplishment of the foregoing objects, and such other objects as may hereinafter appear, the present invention relates to the differential gearing apparatus as sought to be defined in the appended claims taken together with the following specification and the accompanying drawing, in which:

The figure is a longitudinal and axial cross-sectional view of the differential gearing apparatus of the invention with certain parts being shown in full.

Referring now more in detail to the drawing, the differential gearing apparatus comprises in its generic aspect a gear housing generally designated as 10, differential gearing generally designated as 12 within the housing including two opposed bevel gears 14 and 16 and a rotatable spider 18 carrying opposed bevel pinions 20 and 22 each pinion meshing with both said bevel gears 14 and 16, and three coaxial shafts 24, 26 and 28, the shaft 24 being fixed to the bevel gear 14, the shaft 26 being fixed to the bevel gear 16, and the shaft 28 being fixed to the rotatable spider 18, said shafts extending from one side only of said housing for their driving and driven connections.

The housing 10 is designed to encase and seal all of the gear mechanism of the differential gearing system, to mount the differential system as a unit on opposed side walls thereof and to provide for the extension only from one side or end of the housing of the three operative coaxial shafts. To this end the housing 10 comprises a casing 30 having a cylindrical wall 32, a side or end wall 34 preferably integral therewith, and a movable cover 36 forming the opposite side or end wall. The cover wall 36 is removably attachable to the cylindrical wall 32 of the housing by means of bolts 38, 38 screwed into a clamping ring 40 which is anchored to the housing cylindrical wall 32 by means of a retaining ring 42. The differential gearing system 12 is mounted as a unit in the opposite side walls 34 and 36 of the housing by means of a flanged ball bearing 44 fitted to the front side or end wall 34 and a flanged ball bearing 46 fitted to the rear side or end wall 36 in a manner that will be more detailingly described hereinafter. The front wall 34 of the housing is also provided with tapped bores 48, 48 for receiving suitable securing elements for attaching the housing to a suitable support.

The three coaxial shafts 24, 26 and 28 comprise respectively a rod shaft (24) and two sleeve shafts (26 and 28), the rod shaft 24 defining one of the input shafts, the same being affixed as at 50 to the bevel gear 14, the sleeve shaft 26 defining another of the input shafts, the same being affixed to the bevel gear 16 by being preferably made integral therewith, and the sleeve shaft 28 defining an output shaft being provided with a hub 52 which together with the oppositely extending arms 54 and 56 define the spider structure 18. The bevel pinions 20 and 22 are carried by the spider 18 and are mounted for rotation on the arms 54 and 56 respectively of the spider by means of the ball bearings 58 and 60. The ball bearing mounted bevel pinions are secured to the spider by means of the lock nut devices 62 and 64.

All of the moving parts of the differential gearing mechanism are mutually supported and for smooth frictionless relative movement therebetween, and the gear mechanism as a whole or as a unit is in turn supported, in the following ways. All three coaxial shafts 24, 26 and 28 are supported in the front side or end wall 34 by means of the ball bearing 44. The input shaft 24 is supported in the rear side or end wall 36 by means of the ball bearing 46. For the said front support of the coaxial shafts, the input sleeve shaft 26 is directly mounted in the front ball bearing 44, and the sleeve shafts 26 and 28 are mutually supported by the flanged ball bearing 66 therebetween. The three coaxial shafts 24, 26 and 28 are radially spaced one from the other for the greatest part of their lengths, as indicated by the spaces 68 and 70, and make only contact, each shaft with the adjacent shaft, at their outer ends, as at 72 and 74. The extending ends of the coaxial shafts are the ends to which the gearing connections to the differential system are made to the driving and driven motive elements.

In the operation of the differential gearing apparatus described, rotation of the input shafts 24 and 26 in opposite directions will be converted by the differential mechanism to a differential rotation of the output shaft 28 in either one direction of rotation or the other depending upon the relative speeds of rotation of the input shafts 24 and 26, similar to known differential gearing systems.

The structure, operation, mode of assembly, use and resulting advantages of the differential gearing apparatus described will, it is believed, be fully apparent from the above-detailed description. All of the three operative shafts 24, 26 and 28 extend coaxially, and therefore locally only, from one side or end of the differential gearing system enabling all gearing connections to the differential system to be located and to be made on one side thereof. All of the differential gearing mechanism is effectively encased and sealed in the gear housing; and all of the moving parts of the gear mechanism are mutually and firmly supported for frictionless movement and are strongly supported as a unit in the gear housing.

It will be apparent that changes may be made in the structure described without departing from the spirit of the invention defined in the following claims.

I claim:

1. A differential gearing apparatus comprising a gear housing having opposed side walls, differential gearing within the housing including two opposed bevel gears and a rotatable spider carrying opposed bevel pinions each meshing with said bevel gears, said differential gearing being mounted on the opposed side walls of said housing by means of three concentric shafts extending through one of said side walls of said housing for their driving and driven connections, the innermost of said shafts having one of said bevel gears fixed thereto, the other two of said shafts comprising sleeves rotatable relative to said innermost shaft, one sleeve being fixed to said rotatable spider and the other sleeve being fixed to said other bevel gear, the innermost shaft being bearingly mounted in the side wall opposite to the side wall through which the shafts extend, the structure of said bevel gear and sleeve and the structure of said spider and sleeve being provided with a bearing therebetween, and the outermost sleeve being bearingly mounted on the side wall through which the shafts extend.

2. The differential gearing apparatus of claim 1 in which the innermost shaft and the outermost sleeve are bearingly mounted in ball bearings and a ball bearing is provided between the structure of said bevel gear and sleeve and the structure of said spider and sleeve.

References Cited in the file of this patent

UNITED STATES PATENTS

| | | |
|---|---|---|
| 1,821,450 | Stelzer | Sept. 1, 1931 |
| 2,309,759 | Ferguson | Feb. 2, 1943 |
| 2,382,482 | Henry | Aug. 14, 1945 |

FOREIGN PATENTS

| | | |
|---|---|---|
| 24,211 | Great Britain | Nov. 23, 1905 |